United States Patent Office 3,081,326
Patented Mar. 12, 1963

3,081,326
STABILIZING ALKYLLEAD COMPOUNDS
Shirl E. Cook, Baton Rouge, La., assignor to Ethyl
Corporation, New York, N.Y., a corporation of Virginia
No Drawing. Filed Nov. 1, 1961, Ser. No. 149,202
16 Claims. (Cl. 260—437)

This invention relates to mixed methyl and ethyl lead compositions which are stable at temperatures above about 100° C. It also relates to methods for inhibiting the thermal decomposition of certain mixtures of tetraalkyllead compounds when subjected to temperatures in the range of about 100 to about 195° C., at which temperatures thermal decomposition normally becomes appreciable.

More particularly, this invention involves inhibiting the thermal decomposition of mixtures of tetraalkyllead compounds in which the alkyl groups are methyl and ethyl, from 20 to 80 percent of these radicals being methyl, the balance being ethyl. Such mixtures of methyl and ethyl lead compounds are of considerable importance to the art as antiknock agents for modern gasolines. In fact, some of these mixed alkyllead antiknock compositions have achieved commercial status.

One aspect of this invention is concerned with an improved process for separating the foregoing alkyllead mixtures from the reaction products accompanying their synthesis. This invention is also applicable to a method for inhibiting thermal decomposition of these methylethyl lead mixtures during their formation via the redistribution reaction as well as during their purification and blending with other products in making commercial antiknock fluids. The invention is also applicable to minimizing the likelihood of thermal decomposition during storage and transportation of these mixed alkyllead products. It is especially applicable to preventing thermal decomposition of undiluted mixtures of these alkyllead compounds where the likelihood of thermal decomposition is more of a problem.

As is well known, the are several methods for producing mixtures of tetraalkyllead compounds of the type described herein. One such method is the so-called "redistribution reaction," whereby the methyl and ethyl radicals of the initial tetraalkyllead compound or mixture of compounds are caused to interchange by means of a catalyst. For example, an initial mixture of tetraethyllead and tetramethyllead can be caused to redistribute by means of an appropriate catalyst into a mixture containing varying proportions of the 5 possible compounds: tetramethyllead, ethyltrimethyllead, diethyldimethyllead, triethylmethyllead and tetraethyllead. The details of this redistribution reaction are fully described in U.S. 2,270,-108, granted January 13, 1942.

Another process for producing these methyl-ethyl lead mixtures comprises reacting ethyl chloride and a methyl halide with a sodium lead alloy in the presence of a catalyst. This procedure is fully described in U.S. 2,270,109, granted January 13, 1942.

Still another method of producing these alkyllead mixtures is via a combination of the redistribution process with the above-described sodium lead alloy manufacturing process. Complete details as to how this combination process is effected are given in U.S. 2,270,109.

A still further method of producing the methyl-ethyl lead mixtures stabilized in accordance with this invention is to separately prepare each of the individual members of the intended mixture by means of known techniques and then to blend these materials in the desired proportions.

In some of the foregoing processes—particularly those described in U.S. 2,270,109—the mixed tetraalkyllead compounds so-produced are in admixture with various reaction products from which the mixed methyl and ethyl lead compounds must be separated. This separation is effected by steam or vacuum distillation with subsequent purification of the tetraalkyllead distillate. Due to the toxic and unstable nature of these mixed tetraalkyllead compounds, these distillation and purification operations are subject to many difficulties.

In these distillation and purification operations meticulous temperature control and exact safety measures are of paramount importance. The rates of decomposition of the alkyllead mixtures increase very rapidly with small rises in temperatures above the temperature where decomposition becomes appreciable. For example, decomposition of tetraethyllead itself occurs at the rate of approximately 2 percent per hour at a temperature of 100° C. which is the customary temperature used in separating this particular compound from the reaction products accompanying its synthesis. At temperatures above 100° C. the decomposition rate increases logarithmically so that a point is soon reached where external heat is no longer required and decomposition becomes self-propagating. The decomposition rates of the other tetraalkyllead antiknock compounds dealt with by this invention (i.e. tetramethyllead, ethyltrimethyllead, diethyldimethyllead and triethylmethyllead) and the various mixtures thereof (with and without tetraethyllead) are generally comparable. In short, any mixture of tetraalkyllead compounds in which the alkyl groups are methyl and ethyl radicals, 20 to 80 percent being methyl and the balance ethyl, can undergo violent decomposition reactions at temperatures ranging from between about 100 and about 195° C. If these compounds are in partial or total confinement a violent explosion may ensue.

Such likelihood of excessive decomposition is also present during the redistribution process for preparing these mixtures of tetraalkyllead compounds. This is borne out for example by the fact that a catalyst is employed in effecting this redistribution reaction and most of these catalysts will undergo exothermic reactions if inadvertently contacted with moisture. Furthermore, trace impurities may find their way into the concentrated mixture of tetraalkyllead compounds before, during or after the redistribution process and some of these impurities on exposure to air or moisture can give rise to the formation of hot spots which would lead to the inception of pronounced thermal decomposition. Hence, there is a need for an effective method of inhibiting runaway thermal decomposition during these catalytic redistribution reactions.

The likelihood of excessive decomposition is also present during such operations as blending, handling, storage and transportation. Prior to diluting the mixed tetraalkyllead concentrates with scavengers, gasoline or other materials the alkyllead compounds remain as a concentrate and the problem of excessive decomposition exists even though the temperature is maintained normally well below that of decomposition. For example, in purification steps wherein the concentrate is washed and blown with air at atmospheric temperature to remove impurities a sudden increase in temperature may occur due to the oxidation of methyl and ethyl bismuth compounds which may be and frequently are present as impurities. Also pumps used in handling these tetraalkyllead mixtures occasionally "freeze" and the friction developed may cause a local overheating to a temperature above the decomposition temperature. Faulty wiring, leaks onto steam pipes, and other accidental causes also may produce local overheating with resulting dangerous decomposition.

It is seen therefore that in those operations where these alkyllead mixtures are in the substantially undiluted or concentrated state—viz. preparation by redistribution, separation, purification, blending, transportation, and storage—the likelihood of excessive thermal decomposition must be provided for and effectively combatted.

An object of this invention is to stabilize these tetraalkyllead mixtures against thermal decomposition during one or more of the following operations: preparation by redistribution, separation, purification, blending, transportation and storage.

The above and other objects of this invention are accomplished by incorporating with a mixture of tetraalkyllead compounds—the alkyl groups being methyl and ethyl, from 20 to 80 percent being methyl, the balance being ethyl—a relatively small quantity of certain combinations of materials having the property of effectively inhibiting thermal decomposition in the alkyllead mixtures. The foregoing objects are also accomplished by conducting one or more of the foregoing operations in the presence of such a combination of materials.

The thermal stabilizer mixtures of this invention are composed of (1) a hydrocarbon having a boiling point at atmospheric pressure in the range of from about 90 to about 150° C., said hydrocarbon being selected from the group consisting of alkanes or mononuclear aromatics containing only aromatic unsaturation, and (2) at least one member of the group consisting of (a) a fused ring aromatic hydrocarbon containing 10 to about 18 carbon in the molecule, and (b) ethylene dichloride. In other words, this invention provides 3 systems which have been found by actual tests to be exceedingly effective in protecting the foregoing methyl-ethyl lead mixtures against the ravages of thermal decomposition. One such system is made up of the foregoing hydrocarbon boiling at 90 to 150° C. in admixture with the above-described fused ring aromatic hydrocarbon. Another system involves the conjoint use of the hydrocarbon boiling at 90–150° C. with ethylene dichloride. The third system is composed of the hydrocarbon boiling at 90–150° C. plus the fused ring aromatic hydrocarbon plus the ethylene dichloride. The concentrations in which the members of these thermal stabilizer systems are used are susceptible of variation. However, in general, very effective thermal stabilization is achieved when the hydrocarbon boiling at 90–150° C. is present in amount such that there are from about 5 to about 30 parts by weight per each 100 parts by weight of the mixed methyl-ethyl lead compounds. By the same token, the fused ring aromatic hydrocarbon ingredient can be very effectively used in amounts ranging from about 0.05 to about 5 parts by weight per each 100 parts by weight of the alkyllead mixture. In the case of the ethylene dichloride concentrations, good results are achieved when it is present in amount such that there are from about 0.4 to about 1.2 moles thereof per mole of tetraalkyllead compounds contained in the alkyllead mixture.

A feature of this invention is that many of the foregoing compositions exhibit a remarkable synergistic behavior in stabilizing the alkyllead mixtures against thermal decomposition, i.e. the thermal stabilization effectiveness of the whole is far greater than the sum total of its parts.

It will be apparent that this invention is applicable to the stabilization of any mixture of 2 or more of the compounds tetramethyllead, ethyltrimethyllead, diethyldimethyllead, triethylmethyllead and tetraethyllead so long as from 20 to 80 percent of the alkyl radicals in the mixture are methyl with the remainder being ethyl. Therefore, this invention can be used with great advantage in the stabilization of various 2-, 3- and 4-component mixtures of the foregoing tetraalkyllead compounds. However, it is particularly preferred to employ the stabilizers of this invention in various mixtures containing each of the 5 tetraalkyllead compounds described above. Not only are these 5-component mixtures very effectively stabilized pursuant to this invention but they have been found to possess very excellent properties when used as antiknock agents in modern gasolines. Several examples of these preferred 5-component systems (all percentages are by weight) are as follows:

(1) 0.4 percent tetramethyllead, 4.3 percent ethyltrimethyllead, 20.2 percent diethyldimethyllead, 42.1 percent triethylmethyllead, and 33.0 percent tetraethyllead (one-fourth of the alkyl groups are methyl);

(2) 5.7 percent tetramethyllead, 23.8 percent ethyltrimethyllead, 37.4 percent diethyldimethyllead, 26.2 percent triethylmethyllead, and 6.9 percent tetraethyllead (one-half of the alkyl groups are methyl);

(3) 30.0 percent tetramethyllead, 42.1 percent ethyltrimethyllead, 22.2 percent diethyldimethyllead, 5.2 percent triethylmethyllead, and 0.5 percent tetraethyllead (three-fourths of the alkyl groups are methyl).

The ingredient common to the several thermal stabilizer systems of this invention is the hydrocarbons having boiling points at atmospheric pressure in the range of 90 to about 150° C., the hydrocarbon being either an alkane or a mononuclear aromatic containing only aromatic unsaturation. Such compounds are exemplified by isooctane (i.e. 2,2,4-trimethylpentane), 2-methylhexane, n-octane, nonane, xylenes, ethylbenzene, and the like. A particularly preferred material is toluene since this material exhibits a remarkable tendency to coact synergistically with either or both of the other components of the present thermal stabilizer systems. Accordingly, its use constitutes a particularly preferred embodiment in accordance with this invention. The fused ring aromatic hydrocarbons ($C_{10}$ to about $C_{18}$) which can be used in conjunction with the foregoing hydrocarbons are exemplified by such materials as naphthalene, 1-methyl naphthalene, 2-methyl naphthalene, 1,4-dimethyl naphthalene, 1,3-dimethyl naphthalene, 1,2,3,4-tetramethyl naphthalene, 1,5-diethyl naphthalene, anthracene, 1-methyl anthracene, chrysene and various isomers, homologs, analogs thereof. However, of these compounds naphthalene and the various alkylated naphthalenes containing up to about 18 carbon atoms in the molecule are most particularly preferred since these materials are most readily blended with the tetraalkyllead mixtures to form homogenous systems. Moreover, these particular naphthalene compounds have been found to coact with the 90–150° C. B.P. hydrocarbon to give unusually large synergistic effects.

In the practice of this invention propylene dichloride can be effectively used as a total or partial replacement for the ethylene dichloride.

The chief thermal decomposition products of the instant tetraalkyllead mixtures are lead metal and hydrocarbon gases. Hence, a very good index of the thermal decomposition of these alkyllead mixtures is the liberation of these gases.

To illustrate the effectiveness of this invention a series of direct comparisons were made of the decomposition characteristics of unstabilized and stabilized tetraalkyllead mixtures. A thermostatically controlled hot oil bath was fitted with a stirrer, thermometer, and a holder for a small reaction tube to which was attached a condensing section above the oil bath in order to prevent the sample from distilling out of the reaction tube during the test. A 100 cc. gas buret beside the bath, and equipped with a water-containing levelling bottle, was connected by means of rubber tubing with the reaction tube after the desired sample was introduced into this tube. After the bath was brought to a steady temperature of 195 C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

For these tests a group of tetraalkyllead mixtures were prepared by the redistribution technique starting with pure tetramethyllead and pure tetraethyllead. Each mixture was found to be completely redistributed and to have a composition ranging between A and B in the following tabulation:

|  | A, Wt. Percent | B, Wt. Percent |
| --- | --- | --- |
| Tetramethyllead | 3.67 | 8.36 |
| Ethyltrimethyllead | 18.92 | 28.80 |
| Diethyldimethyllead | 36.40 | 37.10 |
| Triethylmethyllead | 31.08 | 21.20 |
| Tetraethyllead | 9.92 | 4.53 |

The compositions tested in the manner described above (one milliliter samples were used) and the results thereby obtained are shown in the following tables.

TABLE 1

*Effect of a Typical 2-Component Stabilizer System of This Invention on Thermal Decomposition of Mixed Alkyllead Compounds at 195° C.*

| No. | Additive(s) Used | Thermal Stability— Time During Which No Decomposition Occurred, Minutes |
| --- | --- | --- |
| [Compositions of this Invention] | | |
| 1 | Toluene (10)[1] + naphthalene (0.15)[1] | 100 |
| [Compositions not of this Invention] | | |
| 2 | None | 0 |
| 3 | Toluene (10) | 0 |
| 4 | Naphthalene (0.15) | 0 |

[1] Parts by weight of the ingredient per each 100 parts by weight of the tetraalkyllead compounds used.

TABLE 2

*Effect of a Typical 2-Component Stabilizer System of This Invention on Thermal Decomposition of Mixed Alkyllead compounds at 195° C.*

| No. | Additive(s) Used | Thermal Stability— Time During Which No Decomposition Occurred, Minutes |
| --- | --- | --- |
| [Compositions of this Invention] | | |
| 1 | Toluene (10)[1]+ethylene dichloride (1)[2] | 475 |
| [Compositions not of this Invention] | | |
| 2 | None | 0 |
| 3 | Toluene (10) | 0 |
| 4 | Ethylene dichloride (1) | 0 |

[1] See corresponding footnote to Table 1.
[2] Number of moles of ethylene dichloride present per mole of the tetraalkyllead compounds used.

TABLE 3

*Effect of a Typical 3-Component Stabilizer System of This Invention on Thermal Decomposition of Mixed Alkyllead Compounds at 195° C.*

| No. | Additive(s) Used | Thermal Stability— Time During Which No Decomposition Occurred, Minutes |
| --- | --- | --- |
| [Compositions of this Invention] | | |
| 1 | Toluene (10)[1]+naphthalene (0.15)[1]+ethylene dichloride (1)[2] | [3]>570 |
| [Compositions not of this Invention] | | |
| 2 | None | 0 |
| 3 | Toluene (10) | 0 |
| 4 | Naphthalene (0.15) | 0 |
| 5 | Ethylene dichloride (1) | 0 |

[1] See corresponding footnote to Table 1.
[2] See corresponding footnote to Table 2.
[3] All tests arbitrarily terminated without reaching any appreciable thermal decomposition. One test had gone as far as 610 minutes without appreciable decomposition.

It will be noted that the compositions of this invention exhibit a remarkable degree of synergistic effectiveness.

The above-described beneficial behavior of the thermal stabilizer mixtures of this invention also takes place with other alkyllead mixtures and with other thermal stabilizer systems described herein.

Other examples of the practice of this invention are given below.

EXAMPLE I

Admixed in a blending tank are an equimolar mixture of tetraethyllead and tetramethyllead, mixed xylenes (o-, m- and p-isomers) and 1,4-dibutylnaphthalene. The amount of xylenes used is equivalent to 5 parts by weight per each 100 parts by weight of the tetraalkyllead mixture. The 1,4-dibutylnaphthalene is used in amount equivalent to 3 parts by weight per each 100 parts by weight of the tetraalkyllead compounds.

EXAMPLE II

Blended with a mixture of triethylmethyllead and ethyltrimethyllead in a molar ratio of 3:1 respectively are 2-methyl-3-ethyl pentane (30 parts by weight per each 100 parts by weight of the tetraalkyllead mixture) and a mixture composed of 80 percent of ethylene dichloride and 20 mole percent of propylene dichloride in amount such that there are 1.2 moles of this last-named mixture per mole of the mixture of tetraalkyllead compounds.

EXAMPLE III

Placed in a reaction vessel are 1 mole of tetraethyllead, 1 mole of tetramethyllead, nonane, an approximately equimolar mixture of methyl and dimethyl naphthalenes, and ethylene dichloride. The amounts of the stabilizer materials are such that per each 100 parts by weight of the tetraalkyllead compounds there are 30 parts by weight of the nonane and 2 parts by weight of the mixed methyl naphthalenes, the amount of ethylene dichloride being such that there is ½ mole thereof per mole of the tetraalkyllead mixture. Thereupon 0.025 mole of anhydrous aluminum chloride is added to the system, the resulting mixture is stirred and the temperature is raised to about 85° C., where it is maintained for 2 hours so as to effect a redistribution into the resultant mixture of the 5 possible tetraalkyllead compounds.

In conducting the redistribution embodiments of this invention it is often convenient to use an excess of the hydrocarbons having boiling points at atmospheric pressure of about 90 to about 150° C. relative to the amount used in formulating the finished compositions of this invention. This excess serves as a convenient solvent for the redistribution reaction and does not detract from the thermal stability protection afforded by the thermal stabilizer combinations of this invention. On completion of the redistribution reaction it is a relatively simple matter to distill off the excess amount of this low boiling hydrocarbon to produce a thermally stabilized mixed tetraalkyllead concentrate of this invention. Such a procedure is illustrated in Example IV.

EXAMPLE IV

Placed in a reaction vessel is a mixture, by weight, of 600 parts of diethyldimethyllead, 300 parts of 2,2,4-trimethyl pentane (B.P. ca 100° C.), 6 parts of 1-methyl naphthalene (B.P. ca 245° C.), and 3 parts of anhydrous aluminum chloride. This mixture is stirred and the temperature is raised to about 85° C. and maintained there for about 2 hours so as to effect redistribution into a tetraalkyllead product containing the 5 possible isomers. Thereupon 200 parts of the 2,2,4-trimethyl pentane are distilled away from the reaction mixture so as to produce a finished concentrate of this invention.

Another optional alternative in the redistribution process embodiment of this invention is to use a still lower boiling hydrocarbon such as hexane along with the thermal stabilizer combinations of this invention. In this way this lower boiling hydrocarbon can serve and implement the stabilizer combination as a convenient redistribution reaction solvent. This lower boiling hydrocarbon can then be distilled off upon completion of the reaction. To illustrate this procedure, the process of Example III is repeated except that there is additionally present in the reactor 150 parts by weight of n-hexane. As indicated, this amount of hexane can be removed from the ensuing redistribution product by distillation, if desired.

EXAMPLE V

Placed into an autoclave equipped with a stirrer and with a jacket having suitable connections for controlling the temperature with steam or with water are, by weight, 1380 parts of the sodium-lead alloy, NaPb, 160 parts of methyl chloride, 416 parts of ethyl chloride, and a catalyst consisting of 2 parts of an aluminum alloy and 4 parts of anhydrous aluminum chloride. The aluminum alloy used contains about 7.5 percent copper, 1.5 percent zinc, 1.2 percent iron, and 1.5 percent silicon, the balance being aluminum. This alloy is used in the form of chips small enough to pass through a 20-mesh screen. The contents of the autocalve are then stirred and maintained at about 100° C. for 4 hours. Next the autoclave is cooled and vented, and the reaction mass is discharged into a still equipped with an agitator and steam jets. At this point toluene, naphthalene and ethylene dichloride are introduced into the steam still in relative amounts such that per each 100 parts by weight of the tetraalkyllead product there are 20 parts by weight of toluene and 0.5 part by weight of naphthalene, the ethylene dichloride concentration being equivalent to 0.8 mole per each mole of the tetraalkyllead product. Thereupon the entire mixture is subjected to steam distillation, the alkyllead compounds formed during the process distilling over with the steam and being protected against thermal decomposition during this operation by the use of the thermal stabilizer system of this invention.

EXAMPLE VI

Blended with a mixture composed of 2 moles each of tetramethyllead and tetraethyllead and 1 mole of diethyldimethyllead are 2,4-dimethyl hexane, toluene and 2-ethyl naphthalene. These hydrocarbon components are each used in amount equivalent to 5 parts by weight per each 100 parts by weight of the tetraalkyllead mixture.

The nature of the hydrocarbon components of the thermal stabilizer systems of this invention will now be well understood by those skilled in the art. Typical of the alkanes and mononuclear aromatics containing only aromatic unsaturation (boiling points: about 90 to about 150° C.) are ethylbenzene, toluene, p-xylene, m-xylene, o-xylene, mixed xylene isomers, 2,2,3,3-tetramethylbutane, 2,3-dimethyl pentane, 3-ethyl pentane, 3-ethyl-2-methyl pentane, 3-ethyl-3-methyl pentane, 2,2,4-trimethyl pentane, 2,3-dimethyl hexane, 2,4-dimethyl hexane, 2,5-dimethyl hexane, 3,4-dimethyl hexane, 3-ethyl hexane, 2-methyl hexane, 3-methyl hexane, n-heptane, 4-ethyl heptane, 2-methyl heptane, 3-methyl heptane, 4-methyl heptane, n-octane, 3-methyl octane, n-nonane, and others. Excellent results are achieved not only by the use of the individual compounds but by use of mixtures of the foregoing compounds, especially mixtures which are readily available on a commercial basis at low cost. Mixed xylenes, mixed dimethyl hexanes, mixed methyl heptanes, and various gasoline fractions boiling in or throughout the range of about 90 to 150° C. serve as examples. As pointed out above, the use of toluene is particularly preferred.

The fused ring aromatic hydrocarbons used in the practice of various embodiments of this invention include such compounds as naphthalene, the various methyl naphthalene isomers, the various dimethyl naphthalene isomers, the various ethyl naphthalene isomers, the various propyl and isopropyl naphthalene isomers, the butyl naphthalenes, the pentyl naphthalenes, the hexyl naphthalenes, the heptyl naphthalenes, the octyl naphthalenes, the dipropyl and dibutyl naphthalenes, anthracenes and the lower alkyl derivatives thereof, 1,2,3,4-tetrahydronaphthalene, and the like. Commercially available mixtures of these materials are particularly useful from a cost-effectiveness standpoint.

This invention is well adapted to the stabilization of the above-described tetraalkyllead mixtures at various stages after they have been formed and the diluents and excess alkyl halide have been discharged from the autoclave. Such a procedure is illustrated by Example V infra. In this way the danger arising from unexpected temperature increases is substantially eliminated.

Most preferably the above thermal stabilizer combinations are employed to stabilize the mixed tetraalkyllead compounds, both in storage and in shipping and especially to stabilize any mixed tetraalkyllead concentrates, i.e. compositions containing at least 80 percent by weight of the mixed tetraethyllead compounds. In this way most of the hazards involved in the event of accidental exposure to elevated temperature will economically and satisfactorily be eliminated. Furthermore, waste of the valuable tetraalkyllead products due to decomposition is considerably minimized through the use of this invention.

Certain other well known alkyllead thermal stabilizer materials can be effectively used in conjunction with the thermal stabilizer complements of this invention, if desired. In this way the effectiveness of the present thermal stabilizer complements can be implemented. Particularly good results have been achieved by the copresence of ethylene dibromide, for example at concentrations equivalent to about 0.4 to about 0.6 mole thereof per mole of the mixed alkylleads being stabilized. Other known alkyllead thermal stabilizers include styrene, hexachloropropylene, 2-ethyl-1,3-hexanediol, furfural, 2-methyl-2,4-pentanediol, and resorcinol.

I claim:

1. A mixture of tetraalkyllead compounds normally susceptible to thermal decomposition at temperatures in the range of about 100 to about 195° C. containing in amount sufficient to inhibit such decomposition
   (1) a hydrocarbon having a boiling point at atmospheric pressure in the range of from about 90 to about 150° C., said hydrocarbon being selected from the group consisting of alkanes and mononuclear aromatics containing only aromatic unsaturation and being present in amount such that there are from about 5 to about 30 parts by weight thereof per each 100 parts by weight of said mixture; and
   (2) at least one member of the group consisting of (a) a fused ring aromatic hydrocarbon containing 10 to about 18 carbon atoms in the molecule, said fused ring aromatic hydrocarbon being present in amount such that there are from about 0.05 to about 5 parts by weight thereof per each 100 parts by weight of said mixture, and (b) ethylene dichloride present in amount such that there are from about 0.4 to about 1.2 moles thereof per mole of tetraalkyllead compounds in said mixture;

said mixture being characterized in that said alkyl groups are selected from the group consisting of methyl and ethyl radicals, from 20 to 80 percent of said radicals being methyl, the balance being ethyl.

2. The composition of claim 1 further characterized in that said mixture is composed of tetramethyllead, ethyltrimethyllead, diethyldimethyllead, triethylmethyllead, and tetraethyllead.

3. The composition of claim 1 further characterized in that said first-named hydrocarbon is toluene.

4. A mixture of tetraalkyllead compounds normally susceptible to thermal decomposition at temperatures in the range of about 100 to about 195° C. containing in amount sufficient to inhibit such decomposition (1) a hydrocarbon having a boiling point at atmospheric pressure in the range of from about 90 to about 150° C., said hydrocarbon being selected from the group consisting of alkanes and mononuclear aromatics containing only aromatic unsaturation and being present in amount such that there are from about 10 to about 40 parts by weight thereof per each 100 parts by weight of said mixture; and (2) a fused ring aromatic hydrocarbon containing 10 to about 18 carbon atoms in the molecule, said fused ring aromatic hydrocarbon being present in amount such that there are from about 0.05 to about 5 parts by weight thereof per each 100 parts by weight of said mixture;

said mixture being characterized in that said alkyl groups are selected from the group consisting of methyl and ethyl radicals, from 20 to 80 percent of said radicals being methyl, the balance being ethyl.

5. The composition of claim 4 further characterized in that said first-named hydrocarbon is toluene.

6. The composition of claim 4 further characterized in that said fused ring aromatic hydrocarbon is selected from the group consisting of naphthalene and alkylated naphthalenes.

7. The composition of claim 4 further characterized in that said first-named hydrocarbon is toluene and said fused ring aromatic hydrocarbon is naphthalene.

8. A mixture of tetraalkyllead compounds normally susceptible to thermal decomposition at temperatures in the range of about 100 to about 195° C. containing in amount sufficient to inhibit such composition (1) a hydrocarbon having a boiling point at atmospheric pressure in the range of from about 90 to about 150° C., said hydrocarbon being selected from the group consisting of alkanes and mononuclear aromatics containing only aromatic unsaturation and being present in amount such that there are from about 10 to about 40 parts by weight thereof per each 100 parts by weight of said mixture; and (2) ethylene dichloride present in amount such that there are from about 0.4 to about 1.2 moles thereof per mole of tetraalkyllead compounds in said mixture;

said mixture being characterized in that said alkyl groups are selected from the group consisting of methyl and ethyl radicals, from 20 to 80 percent of said radicals being methyl, the balance being ethyl.

9. The composition of claim 8 further characterized in that said hydrocarbon is toluene.

10. A mixture of tetraalkyllead compounds normally susceptible to thermal decomposition at temperatures in the range of about 100 to about 195° C., containing in amount sufficient to inhibit such decomposition (1) a hydrocarbon having a boiling point at atmospheric pressure in the range of from about 90 to about 150° C., said hydrocarbon being selected from the group consisting of alkanes and mononuclear aromatics containing only aromatic unsaturation and being present in amount such that there are from about 10 to about 40 parts by weight thereof per each 100 parts by weight of said mixture;

(1) a fused ring aromatic hydrocarbon containing 10 to about 18 carbon atoms in the molecule, said fused ring aromatic hydrocarbon being present in amount such that there are from about 0.05 to about 5 parts by weight thereof per each 100 parts by weight of said mixture; and (3) ethylene dichloride present in amount such that there are from about 0.4 to about 1.2 moles thereof per mole of tetraalkyllead compounds in said mixture;

said mixture being characterized in that said alkyl groups are selected from the group consisting of methyl and ethyl radicals, from 20 to 80 percent of said radicals being methyl, the balance being ethyl.

11. The composition of claim 10 further characterized in that said first-named hydrocarbon is toluene.

12. The composition of claim 10 further characterized in that said fused ring aromatic hydrocarbon is selected from the group consisting of naphthalene and alkylated naphthalenes.

13. The composition of claim 10 further characterized in that said first-named hydrocarbon is toluene and said fused ring aromatic hydrocarbon is naphthalene.

14. A method of inhibiting the decomposition of a mixture of tetraalkyllead compounds normally susceptible to thermal decomposition at temperatures in the range of about 100 to about 195° C., said mixture being characterized in that said alkyl groups are selected from the group consisting of methyl and ethyl radicals, from 20 to 80 percent of said radicals being methyl, the balance being ethyl, which comprises incorporating with said mixture a thermal stabilizer combination as defined in claim 1, said combination being present in amount sufficient to inhibit such decomposition.

15. In the process of producing a mixture of tetraalkyllead compounds normally susceptible to thermal decomposition of temperatures in the range of about 100 to about 195° C. by reacting a sodium-lead alloy with ethyl chloride and a methyl halide in the presence of a catalyst, and separating the thus produced tetraalkyllead product from the reaction mass by steam distillation, the step which comprises conducting said steam distillation in the presence of a thermal stabilizer combination as defined in claim 1, said combination being present in amount sufficient to inhibit such decomposition.

16. In a redistribution process wherein a mixture of methyl and ethyl tetraalkyllead compounds containing the methyl-ethyl mixed alkyllead compounds is produced by effecting the interchange of methyl and ethyl radicals between the lead tetraalkyllead molecules by means of a catalyst, the improvement in which said redistribution is effected in admixture with a thermal stabilizer combination as defined in claim 1, said combination being present in amount sufficient to inhibit thermal decomposition of the alkyllead compounds at temperatures of from about 100 to about 195° C.

No references cited.

UNITED STATES PATENT OFFICE
CERTIFICATE OF CORRECTION

Patent No. 3,081,326                      March 12, 1963

Shirl E. Cook

It is hereby certified that error appears in the above numbered patent requiring correction and that the said Letters Patent should read as corrected below.

Column 1, line 40, for "the" read -- there --; column 4, lines 17 and 18, for "ethyltrilethyllead" read -- ethyltrimethyllead --; column 5, line 3, for "195 C." read -- 195° C. --; line 66, TABLE 2, last column, opposite No. 1, for the indistinct numeral, read -- 475 --; column 6, line 25, for "withou" read -- without --; column 9, line 57, for "composition" read -- decomposition --; column 10, line 16, for "(1)" read -- (2) --; line 64, for "the" read -- an --.

Signed and sealed this 28th day of May 1963.

(SEAL)
Attest:

ERNEST W. SWIDER                              DAVID L. LADD
Attesting Officer                                 Commissioner of Patents